Figure 1:
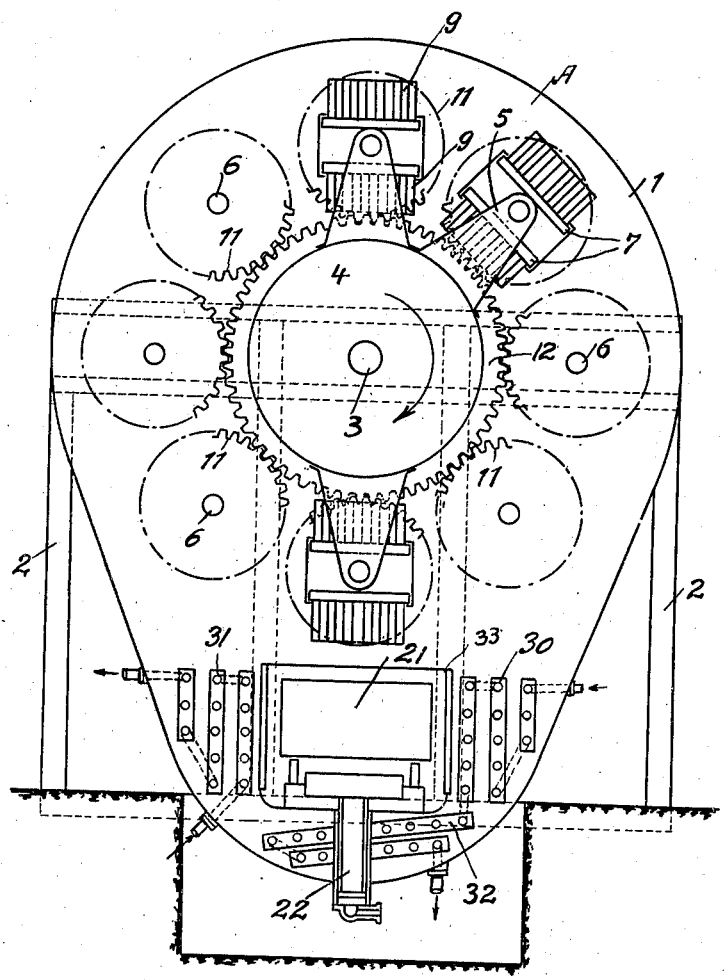

Patented Oct. 14, 1941

2,258,642

UNITED STATES PATENT OFFICE 2,258,642

APPARATUS FOR PRODUCING ARTICLES FROM DISSOLVED PLASTIC SUBSTANCES BY IMMERSION

Albert Boecler, Berlin, and Kurt Bratring, Dahlem, Berlin, Germany, assignors, by mesne assignments, to Neocell Products Corporation, a corporation of Delaware Application July 9, 1938, Serial No. 218,325

8 Claims. (Cl. 18—24)

This invention relates to apparatus for producing articles from dissolved plastic substances by immersion, and has for its object to provide improved apparatus of this character, designed to produce the molded articles by means of an economical and practical working cycle, properly timing and relating the period of the immersion, which is short, with the period required for drying the articles, which is necessarily long.

In a form of dipping apparatus well known in the rubber industry a plurality of frames, each carrying a number of molds, are mounted on a machine so arranged that as the machine rotates the frames are one by one brought to a position in which they can be dipped into the bath, which is frequently accomplished by lifting the bath by a hydraulic plunger. This arrangement, however, will not lead to the production of properly made articles of cellulose derivatives, particularly cellulose acetate, because, in such an arrangement, when a frame has been dipped and moved out of the way to allow the next frame to be dipped, the molds are obliged to assume a position either horizontal or at an angle to the vertical, whereupon the cellulosic material thereon, being still in a soft, more or less liquid condition, tends to run on the lower side of the mold, with the result that the wall of the final formed article is of uneven thickness.

It is well known that after a mold has been dipped it should be turned upside down, to help the semi-liquid deposit on it to equalize itself. If it is maintained in that position until the article "sets" or hardens the resulting article will be satisfactory, but such maintenance is inconsistent with the use of a large number of frames in the same machine.

To avoid these difficulties we have invented a machine in which a number of frames, each carrying a number of molds, are so mounted and arranged as to give each mold a continuous slow rotary motion about an axis at a point about in line with the axis of the mold, so that the mold is continually being turned over and over and all danger of the concentration of the cellulosic material at one side of the mold is obviated. In order to allow the dipping process to be performed we arrange matters so that when any mold-carrying frame arrives at the dipping position this slow rotating movement may be interrupted long enough to dip.

In this manner we are able to use so many molds in a single machine that the mold has time enough, after it has been dipped, to dry sufficiently for a second dipping treatment before it returns to the dipping position, which enables the operation of the machine to be continuous and uninterrupted.

To accomplish these results we provide on a rotatable supporting frame a number of mold-carrying frames, each adapted to receive mold supports, and make the frames separately rotatable on axes not concentric with, but parallel with, the main axis of the machine, and also provide operating means on the shafts of those frames for causing their continuous slow rotation as above described.

With this arrangement it is possible, during the time in which the moulds on one support are immersed in the solution, to maintain the remaining support or supports, then undergoing their drying treatment, in continuous rotation, so that any excess of plastic substance is distributed evenly over the entire moulded article and a surplus of substance or disfigurations at the neck or the bottom of the article are avoided. At the same time the drying process and the immersion process are united in concurrently timed relation to one another, the ratio between the drying period and the immersion period being governed by proper selection of the number of mould supports which are maintained in rotation during the drying period. Thus the output of the complete machine is determined by the time required for the immersion, and not by the drying time.

Further, according to the invention, provision is also made for so conducting the mould supports, which during the drying period move in planetary fashion about a sun wheel drive, through the portion of the apparatus situated above the immersion bath that in following this path they are moved in opposition to a hot current of air exerting a drying effect thereon. This oppositely directed movement can be brought about by causing a mechanically blown (or, by the suitable selection of heating and cooling points, thermally moved) hot current of air to be directed in opposition to the direction of rotation of the planetary units.

It is usually desirable to allow the moulded articles to remain head directly upwards or downwards after the first immersion, and provision is made in accordance with the invention for securing two oppositely mounted mould supports so as to be capable of rotating in common about each shaft. An additional advantage of this arrangement consists in the fact that each shaft is thus statically balanced as compared with the one-sided loading which exists when only one mould support is provided.

The invention is illustrated by way of example in the accompanying drawings, in which Fig. 1 is a diagrammatical view of the apparatus.

Figure 2:
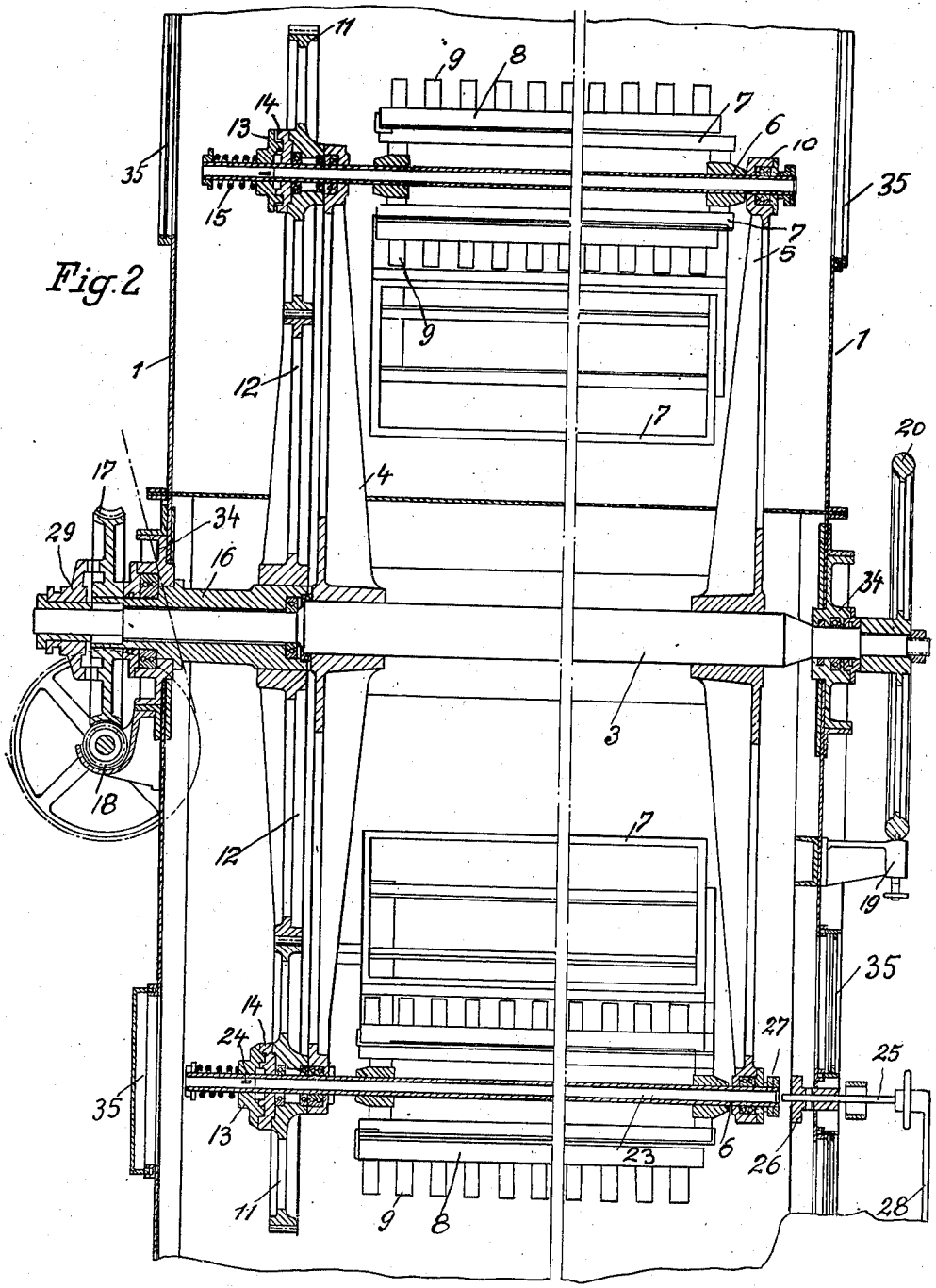

Fig. 2 is a view on different scale and broken along the centre showing part of a longitudinal section through the apparatus.

In Figs. 1 and 2 there is shown mounted centrally in the casing 1, which is supported statically by a supporting structure 2, a main driving shaft 3. On this driving shaft 3 there is mounted a primary rotatable frame 4, which serves as planet support and, by means of peripheral brackets 5, carries hollow shafts 6 about its periphery. These shafts 6 are arranged to rotate in bearings in the brackets 5, and are therefore termed planet shafts. On each planet shaft 6, a plurality of which can be provided simultaneously on the planet support, there are located two oppositely disposed frames 7, furnished with slideways into which racks 8 bearing moulds 9 mounted thereon can be introduced in the conventional manner. Each hollow shaft 6, which projects at the one end out of the frame 4, carries a planet wheel 11 meshing with a sun wheel 12 on the main shaft 3. The planet wheels 11 are not keyed or otherwise rigidly fixed to the shafts 6, but each may turn freely on its shaft. Each hollow shaft 6 extends beyond the planet wheel 11 and carries, directed towards the planet wheel, a dog clutch member 13 which, under the action of a spring 15, engages with a corresponding clutch member 14, mounted on the planet wheel 11.

The sun wheel 12 is not rigidly fixed to the main shaft 3 but is shrunk onto a sleeve 16, which runs idly on the central shaft 3 and projects out of the casing 1. On this projecting portion the sleeve 16 carries a worm wheel 17, which during operation of the apparatus is continuously driven by a worm 18. The rotary motion imparted to the sun wheel 12 by way of the worm drive 17, 18 causes a continuous planetary motion of the wheels 11 and together therewith, when the clutch 13, 14 is engaged, a continuous rotation of the frames 7, in so far as the planet support 4 exhibits a differential movement in relation to the sun wheel 12.

This differential movement is brought about by the fact that the planet support 4 with its shaft 3 is on occasion rigidly held in suitable fashion, either by a band brake or a peripheral braking means, for example by a pawl 19 mounted on the framework of the apparatus and engaging the periphery of a hand-wheel 20, mounted on the rear extension of the shaft 3 through the casing 1. This braking action or engagement is made when an immersion frame 7 with its rocks 8 and moulds 9 is situated in the lowermost position above the immersion bath 21, which for the purpose of immersion of the moulds can be lifted by a hydraulic plunger 22.

In this position governed by the pawl 19, which position if desired can be finely adjusted by the hand-wheel 20 prior to the engagement of the pawl by allowing the hand-wheel to ride gently while restrained from overshooting by the hand brake, the lowermost shaft 6 together with its frame 7 mounted thereon can be disengaged from its planet gear 11 by the following mechanism.

Inside each hollow shaft 6 is a plunger rod 23, guided loosely in the hollow shaft and engaging at one end in a slot guide 24 in the clutch member 13. The opposite end of the rod 23 is located in the fixed position of immersion opposite a plunger 25, by means of which pressure can be exerted from the exterior of the casing on the rod 23. When pressure is applied to the plunger 25 the rod 23 is displaced axially in the hollow shaft 6 and by reason of its engagement with the dog clutch 13 it lifts the latter out of engagement with the clutch member 14 on the planet wheel 11. At the same time a dog clutch member 26 mounted on the plunger 25 engages with a corresponding clutch member 27 mounted on the hollow shaft 6. The hollow shaft 6, disengaged from the planet drive, now undergoes any rotary motion imparted to the immersion frame from the exterior by way of the plunger 25.

For communicating this rotary motion there is provided on the plunger rod outside of the casing a handle 28.

During the lifting and lowering of the immersion bath 21 by means of the hydraulic plunger 22 the lowermost set of immersion frames 7 remains stationary, with mutual locking of the movements of the plunger 25 and the valves of the hydraulic device 22, whilst all remaining immersion frames 7 continue to rotate about their own shafts owing to the continued rotation of the sun wheel 12. After completion of the immersion for one frame, the oppositely located frame mounted on the same planet shaft 6 can be moved into the immersion position by rotation of the handle 28. When the immersion has been completed for both frames, the plunger 25 is withdrawn, to disengage the clutch 26, 27 and reengage the clutch 13, 14 while the locking of the planet support 4 by means of the pawl 19 is again interrupted and the central shaft 3 is again coupled with the worm wheel 17 by the engagement of a dog clutch 29, so that the planet support 4 commences to move in common with the sun wheel 12. Disengagement takes place immediately the next set of moulds has reached the lowermost position whereupon, after release of the clutch 29, the central shaft 3 is locked in position by engagement of the pawl 19 in a new indent of the wheel 20 and the immersion can take place, for the next frame, while moulds on all other frames 7 can be dried with continuous rotary motion of their frames.

For carrying out the drying process the step-by-step advance of the planet support 4 is directed in opposition to a hot drying current of air. A convenient method of bringing about this movement of the air in opposition to the direction of movement of the support 4 is as follows.

The gastight casing 1 is formed of sheet metal welded together in ovoid form, the thickness of the sheet metal being such that the welded casing 1 is self-supporting. This self-supporting casing 1 is attached in vibration-insulated fashion in the supporting structure 2 and firmly secured to the bed of the apparatus. All gear parts and also all parts which are moved during the operation, such as the shaft 3 of the planet gear 4, 11, 12, the rails of the movable immersion bath 21 and the hydraulic device 22, are supported on the structure 2 in such a way that their vibrations are not transmitted to the casing 1 and therefore do not exert any harmful effect. Since this anti-vibratory mounting is fully and clearly disclosed and claimed in our co-pending application Ser. No. 218,323, filed July 9, 1938, we have, to simplify the drawings, not shown the details of the mechanism by which the insulation from vibration is effected, as the same forms no part of our present invention, although it is useful in connection therewith.

Owing to the ovoid cross-sectional form of the self-supporting gastight casing the drying of the moulds 9 moving within the casing takes place as follows: At the bottom of the casing in the space between the wall of the casing and the wall of the immersion bath chamber and at the side thereof toward which the mould frames are moved by rotation of the planet support, there is provided immediately in front of the point of immersion and below the immersion bath chamber 33 a heating coil system 30 and 32, which imparts to the air situated within the casing at this point a thermal lift which is directed towards the right in Fig. 1. The hot air generated rises to the right of the central axis, first meets the moulds 9 which have reached the most advanced drying stage, moves on upwards past these moulds, is deflected by the wall of the casing 1 towards the top of the apparatus, and finally, owing to the cooling caused as the drying operation progresses, sinks to the bottom of the casing to the left of the central axis.

The moulded articles which have only just previously been produced by immeresion and would be more or less sensitive to a too rapid drying under the action of a hot current of air accordingly have very little preheated air conducted to them by reason of the circulation. The thermal circulation may be assisted to a large extent by the provision of a cooling coil system 31, immediately behind the point of immersion and in the space between the wall of the casing and the wall of the immersion bath chamber, and at the opposite side thereof from the heating coils 30. This coil system 31 rapidly cools the sinking air, allows it to fall to the bottom of the casing, and conducts it between the casing wall 1 and the wall of the immersion bath chamber 33 to the heating coils 32 for renewed lift. For an analysis of the air temperature which should, for best results, be maintained at the various stages of the drying process, reference is made to the application of Kurt Bratring, Ser. No. 218,327, filed July 9, 1938, as the same forms no part of our present invention, though it is useful in connection therewith.

What we claim as new and desire to secure by Letters Patent is:

1. A machine for the continuous production of articles from dissolved plastic substances by immersion, comprising a rotary supporting frame arranged to serve as planet support, a plurality of mould supports disposed angularly to one another and rotatably mounted to act as planet elements about the periphery of the planet-supporting frame, each mould support comprising two oppositely mounted mould-supporting frames having a common axis of rotation, a central wheel rotatably mounted on the shaft of the supporting frame engaging with gear wheels mounted on the shafts of the mould supports, driving means for rotating the said central wheel, means for periodically coupling the shaft of the planet-supporting frame with the said driving means for the central wheel for moving a mould support out of the position of immersion and moving the next mould support into the immersion position, means for braking the shaft of the planet-supporting frame, means for adjustment by hand for locking the planet supporting frame in the position of immersion, and means for causing the flow of a drying current of air in opposition to the direction of movement of the planet-supporting frame.

2. A machine for the continuous production of articles from dissolved plastic substances by immersion, comprising a supporting frame rotatable step by step and acting as planet support, a plurality of mould supports disposed angularly to one another and rotatably mounted to act as planet elements about the periphery of the planet-supporting frame, a central wheel mounted to rotate continuously during the operation on the shaft of the planet-supporting frame, gear wheels in association with the said mould supports engaging with the said central wheel, means for disengaging the mould support situated in the position of immersion above the immersion bath from the planet drive, and means for rotating the disengaged mould support by hand.

3. Apparatus for the production of articles of plastic composition by immersion of moulds in a bath, which comprises a primary frame and a primary gear separately rotatable about a main axis, a plurality of secondary axes fixed in said primary frame, parallel to but not in line with said main axis, a secondary frame and a secondary gear separately rotatable about each of said secondary axes, all of said secondary gears meshing with said primary gear, means for locking said primary frame to said primary gear, and means for locking said secondary frames to said secondary gears.

4. Apparatus for the continuous production of articles of plastic composition by immersion of moulds in a bath, which comprises a primary frame rotatable about a main axis, a plurality of secondary frames mounted to rotate about secondary axes fixed in said primary frame, parallel to but not in line with said main axis, means comprising a plurality of gear trains, each coupled to one of said secondary frames, one gear of each of said trains being common to all of said trains, for continuously rotating said secondary frames about said secondary axes, means for intermittently locking said primary frame to said common gear, and means for uncoupling a preassigned one of said secondary frames from the gear train associated therewith.

5. Apparatus for the continuous production of articles of plastic composition by immersion of moulds in a bath, which comprises a primary frame rotatable about a main axis, a plurality of secondary frames mounted to rotate about axes fixed in said primary frame, parallel to but not in line with said main axis, a drive coaxial with said primary frame for producing continuous rotation of all of said frames about their respective axes, means for disengaging the drive of said main frame, and means, including a hand-wheel, a band-brake, and a pawl, for easing said main frame gently into a desired position and maintaining it securely in said position.

6. Apparatus for the continuous production of articles of plastic composition by immersion of moulds in a bath which comprises a primary frame rotatable about a main axis, a plurality of secondary frames mounted to rotate about axes fixed in said primary frame, parallel to but not in line with said main axis, moulds supported on said secondary frames, means for rotating said primary frame to effect a step by step advance of said secondary frames and bring each of said secondary frames in succession into immersion position, means for maintaining continuous rotation of said secondary frames about said secondary axes, means for interrupting said rotation of a desired one of said secondary frames, and means for maintaining a flow of progressively warmer air counter to the direction of advance of said secondary frames.

7. Apparatus for the production of articles of plastic composition by immersion of moulds in a bath, which comprises a primary frame and a primary gear separately rotatable about a main axis, a plurality of secondry axes fixed in said primary frame, parallel to but not in line with said main axis, a secondary frame and a secondary gear separately rotatable about each of said secondary axes, all of said secondary gears meshing with said primary gear, means for locking said primary frame to said primary gear, and means for locking said secondary frames to said secondary gears, to produce, in the alternative, rotation of said primary frame about said main axis or rotation of said secondary frames about said secondary axes.

8. Apparatus for the continuous production of articles of plastic composition by immersion of moulds in a bath which comprises a primary frame rotatable about a main axis, a plurality of secondary frames mounted to rotate about axes fixed in said primary frame, parallel to but not in line with said main axis, moulds supported on said secondary frames, means for rotating said primary frame to effect a step by step advance of said secondary frames and bring each of said secondary frames in succession into immersion position, means for maintaining continuous rotation of said secondary frames about said secondary axes, and means for interrupting said rotation of a desired one of said secondary frames.

ALBERT BOECLER.
KURT BRATRING.